REPEATER APPARATUS FOR COMMUNICATION AND SIGNALING SYSTEMS

Filed Oct. 26, 1949 5 Sheets-Sheet 1

INVENTOR.
Adrian R. Doucette
BY [signature]
HIS ATTORNEY

May 12, 1953 A. R. DOUCETTE 2,638,513

REPEATER APPARATUS FOR COMMUNICATION AND SIGNALING SYSTEMS

Filed Oct. 26, 1949 5 Sheets-Sheet 2

INVENTOR.
Adrian R. Doucette
BY
HIS ATTORNEY

REPEATER APPARATUS FOR COMMUNICATION AND SIGNALING SYSTEMS

Filed Oct. 26, 1949 5 Sheets-Sheet 3

INVENTOR.
Adrian R. Doucette
BY
[signature]
HIS ATTORNEY

INVENTOR.
Adrian R. Doucette
BY
HIS ATTORNEY

May 12, 1953 A. R. DOUCETTE 2,638,513

REPEATER APPARATUS FOR COMMUNICATION AND SIGNALING SYSTEMS

Filed Oct. 26, 1949 5 Sheets-Sheet 5

INVENTOR.
Adrian R. Doucette
BY
[signature]
HIS ATTORNEY

Patented May 12, 1953 2,638,513

UNITED STATES PATENT OFFICE 2,638,513

REPEATER APPARATUS FOR COMMUNICATION AND SIGNALING SYSTEMS

Adrian R. Doucette, Swissvale, Pa., assignor to Westinghouse Air Brake Company, a corporation of Pennsylvania Application October 26, 1949, Serial No. 123,669

3 Claims. (Cl. 179—171)

Figure 1:
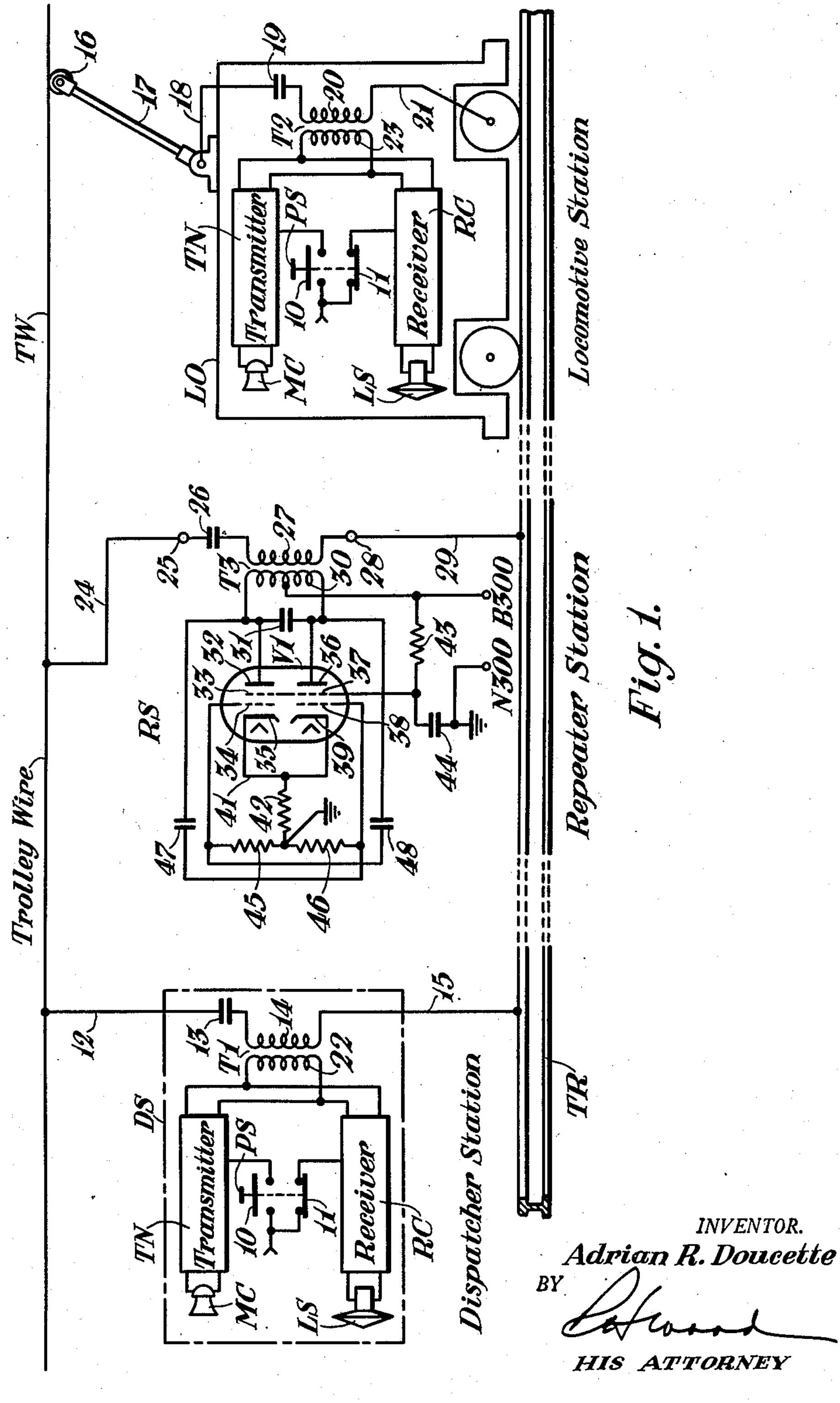

My invention relates to repeater apparatus for communication and signaling systems and more particularly to such systems using frequency modulation and/or frequency codes.

In many communication and signaling systems the range of effective transmission may be limited due to the attenuation of the energy in the transmitting circuit and also due to the system using a relatively low power transmitter. For example, a system may rely upon a transmitting circuit the line conductors of which may have a high impedance for the current used and a poor insulation resistance. Also, when a carrier current is employed the frequency may be high enough so that a substantial radiation is caused and the power supplied by the transmitter to the line circuit must be of a relatively low energy level if the system is to comply with the so-called low power rule. It is obvious that these systems having high attenuation and low energy level will require repeater apparatus at spaced intervals if effective response of a receiver located some distance away from the transmitter is to be obtained.

Repeater apparatus in many communication and signaling systems is not easy to apply. For example, inductive carrier communication systems for railway trains and vehicles operating over a trackway ordinarily rely upon line wires paralleling the trackway as elements of a transmitting medium or channel. These line wires form elements of the transmitting channel due to the longitudinal circuit formed by the line wires, their distributed impedance to ground and the ground path. Consequently, the existing line wires used in transverse telegraph or voice current telephone circuits may be elements in the transmitting channel for the inductive carrier system. However, it is apparent that any repeater apparatus for an inductive carrier system using the existing line wires must be of a construction that it can be electrically associated with the line wires in a way that it will not interfere with the transverse circuit in which the line wires are at present used.

Again, mine communication systems using a modulation carrier have been proposed in which the trolley wire and the track rails of an electric mine railway are used as the transmitting medium. In these mine communication systems the attenuation of the communication current may be extremely high and it is apparent that any repeater apparatus provided must be of a nature that it will not interfere with the normal use of the trolley wire.

In most communication systems of the type here contemplated, a two-way communication is required and any repeater apparatus must be bidirectional. Also, it is desirable for the energy to be amplified and resupplied to the line circuit by the repeater apparatus without a change in the carrier frequency.

Also, in space radio systems using frequency modulation a repeater may be required. For example, a low power portable transmitter may be used and the range at which a receiver will effectively respond is less than that desired and repeater apparatus is required. Furthermore, in ultra high frequency radio systems, a line of sight transmission may prevail and proper response of a receiver may not be had due to its location with respect to the transmitter and a repeater is required in order to direct the energy to the receiver.

Repeater apparatus heretofore proposed for communication and signaling systems of the type here contemplated have been for the most part of a complicated construction so that the installation and maintenance thereof are costly and difficult.

Accordingly, a feature of my invention is the provision of novel and improved bidirectional repeater apparatus for communication and signaling systems.

Another feature of my invention is the provision of improved repeater facilities having a construction wherewith carrier communication or signaling energy is received from a transmitting medium and reapplied thereto in amplified form with the amplified energy having the same carrier frequency, modulation and phase as that of the original energy.

Another feature of my invention is the provision of communication system repeater apparatus incorporating novel and improved oscillator means in which free oscillations are avoided but oscillations can be forced according to an applied signaling wave and which oscillator means functions as a power amplifier.

Again, a feature of my invention is the provision of communication system repeater apparatus incorporating a novel and improved synchronized or so-called "lock-in" oscillator having common input and output terminals.

Still another feature of my invention is the provision of frequency modulated current repeater apparatus which can be coupled to a line circuit in such a manner that neither the continuity of the line wires nor the use of the line wires in other circuits is disturbed.

A more specific feature of my invention is the provision of communication current repeater apparatus that can be electrically coupled to a trolley wire of an electric railway.

Another object of my invention is the provision of improved repeater facilities for frequency modulated current wherewith the repeater facilities can be duplicated and the current transmitted for a relatively long distance along a line circuit without distortion. That is, a plurality of repeaters can be installed one after the other and all will satisfactorily follow the original transmitter to give the system a relatively high gain.

Another feature of my invention is the provision of improved frequency modulated current repeater apparatus wherewith the nonmodulated carrier can be supplied during noncommunication periods and the usual noise suppression or squelch circuits of the receivers of the system may not be required.

Again, a feature of my invention is the provision of improved repeater facilities that are relatively simple in construction and which can be arranged for simplex or duplex operation.

Also, a feature of my invention is the provision of improved repeater apparatus which can be used with coded alternating current signaling circuits.

Another feature of my invention is the provision of repeater apparatus incorporating improved means to increase the frequency deviation range of an associated lock-in oscillator.

Other features, objects and advantages of my invention will appear as the specification progresses.

Wherever the term "frequency modulation" is used through the specification and claims, it should be understood to refer to any modulation wherein the instantaneous frequency of the transmitted wive is varied by the application of a modulating voltage of an alternating character. Wherever the term "forced oscillations" is used in the specification and claims it is to be understood as referring to oscillations created in circumstances in which no free oscillation is able to take place. Again, wherever the term "synchronized" or "lock-in" oscillator is used in the specification and claims it should be understood to refer to an oscillator which tends to synchronize with an injected voltage wave of a frequency that deviates within a given band from the fundamental frequency of the oscillator, the wave supplied to the output of the oscillator being of a magnitude greater than that of the injected wave. Furthermore, the term "transmitting medium" when used in the specification and claims should be understood to include a circuit made up with physical conductors and also the space between two radiating elements.

The foregoing objects, features and advantages of my invention I attain by the provision of a novel and improved oscillator means either of the forced or of the synchronized type and which oscillator is provided with a pair of terminals which receive the control or injected voltage for the oscillator and to which terminals the output of the oscillator is also supplied for being applied to a load circuit. That is, the oscillator has a pair of terminals common to its input and output. Preferably the oscillator is of the electron tube type which also functions as a power amplifier. A push-pull arrangement of electron tube oscillator is preferred but other arrangements of electron tube oscillator circuits can be used. Furthermore, I have found that a two stage push-pull electron tube oscillator arrangement has certain advantages. In certain forms of the invention the repeater is provided with an oscillator having a reactance modulator and a discriminator to increase the lock-in range of the oscillator. In still another form of the invention a push-pull oscillator with an amplifier stage is provided and the transmitting circuit is coupled into resistive elements between the stages, and the oscillatory circuit is made to offer approximately resistive impedance at all frequencies of interest. In this form the oscillator is preferably inactive except when a signal voltage is applied thereto. Again, in one form of the invention the repeater apparatus is arranged that no free oscillations are able to take place and the oscillator is characterized to follow an alternating voltage coded by being periodically interrupted.

I shall describe five forms of apparatus embodying my invention and shall then point out the novel feature thereof in claims.

Figure 2:
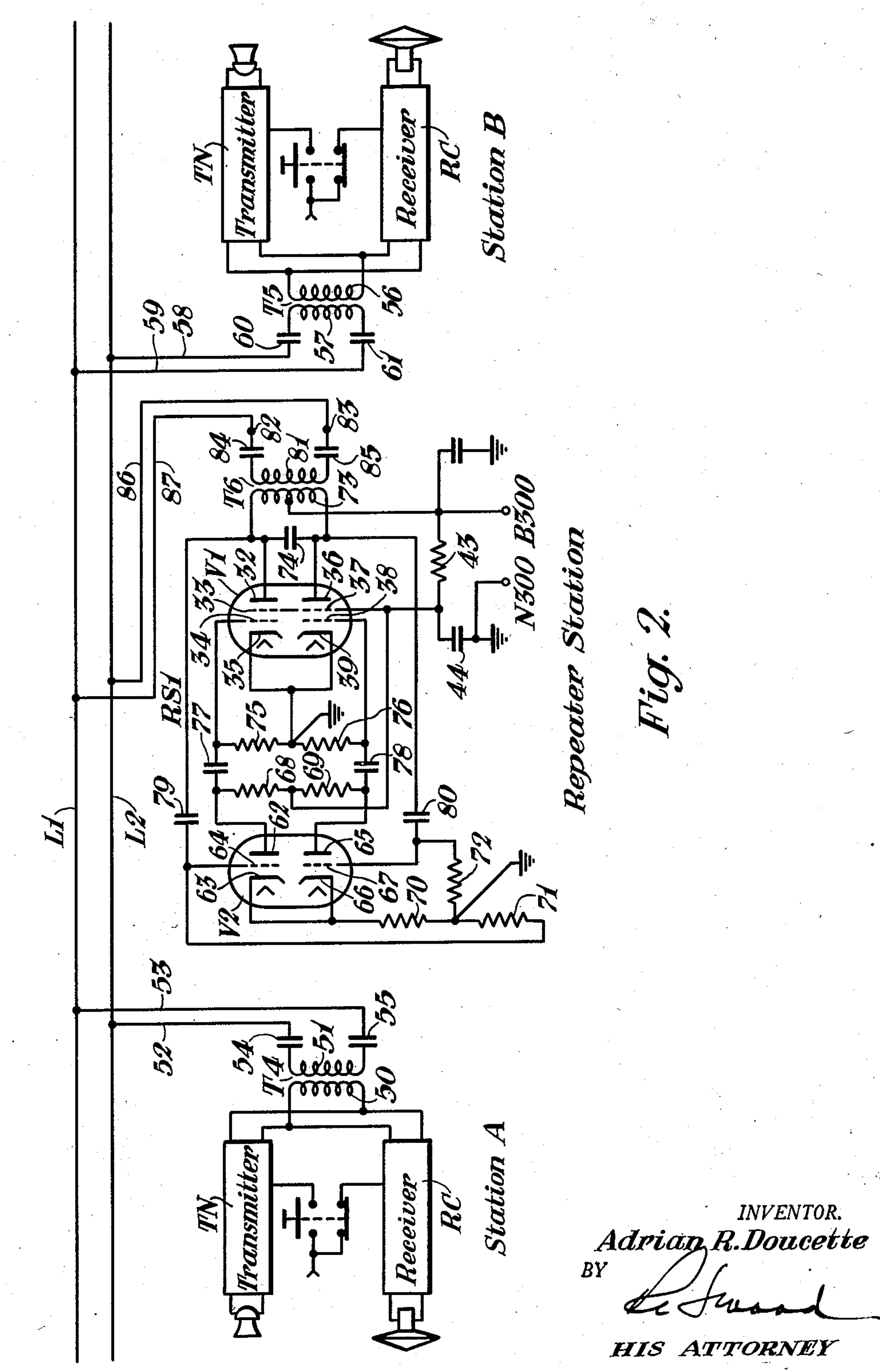
Figure 3:
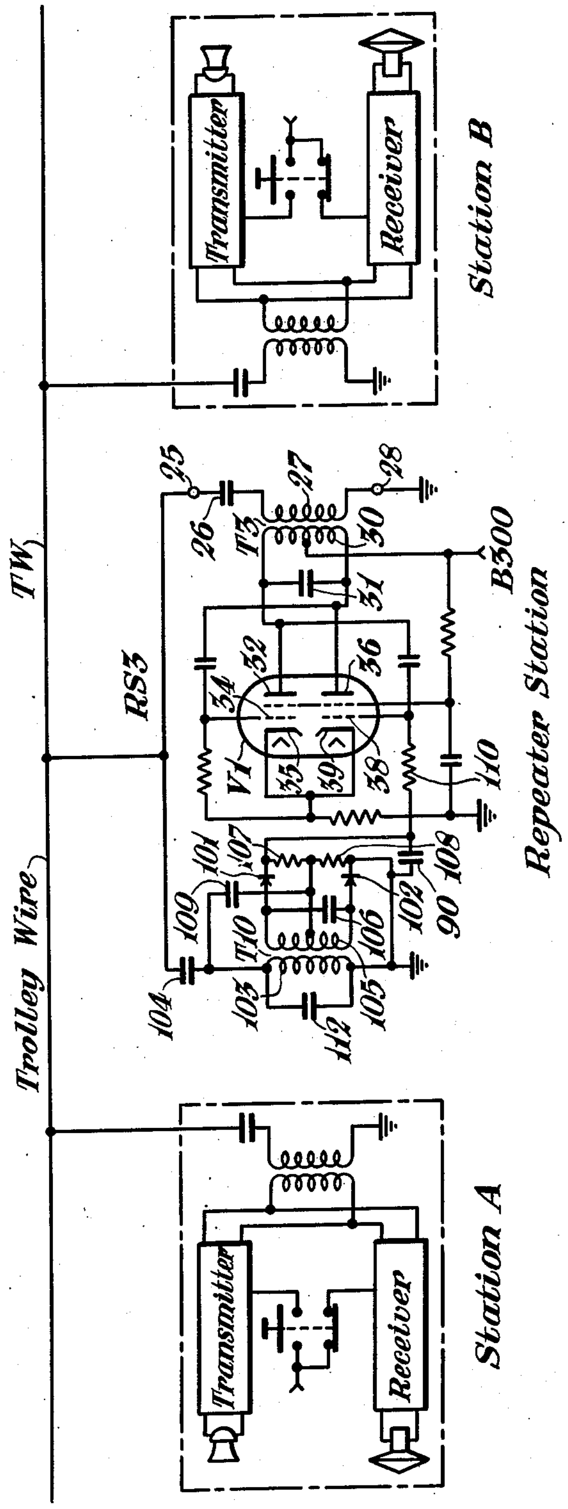
Figure 4:
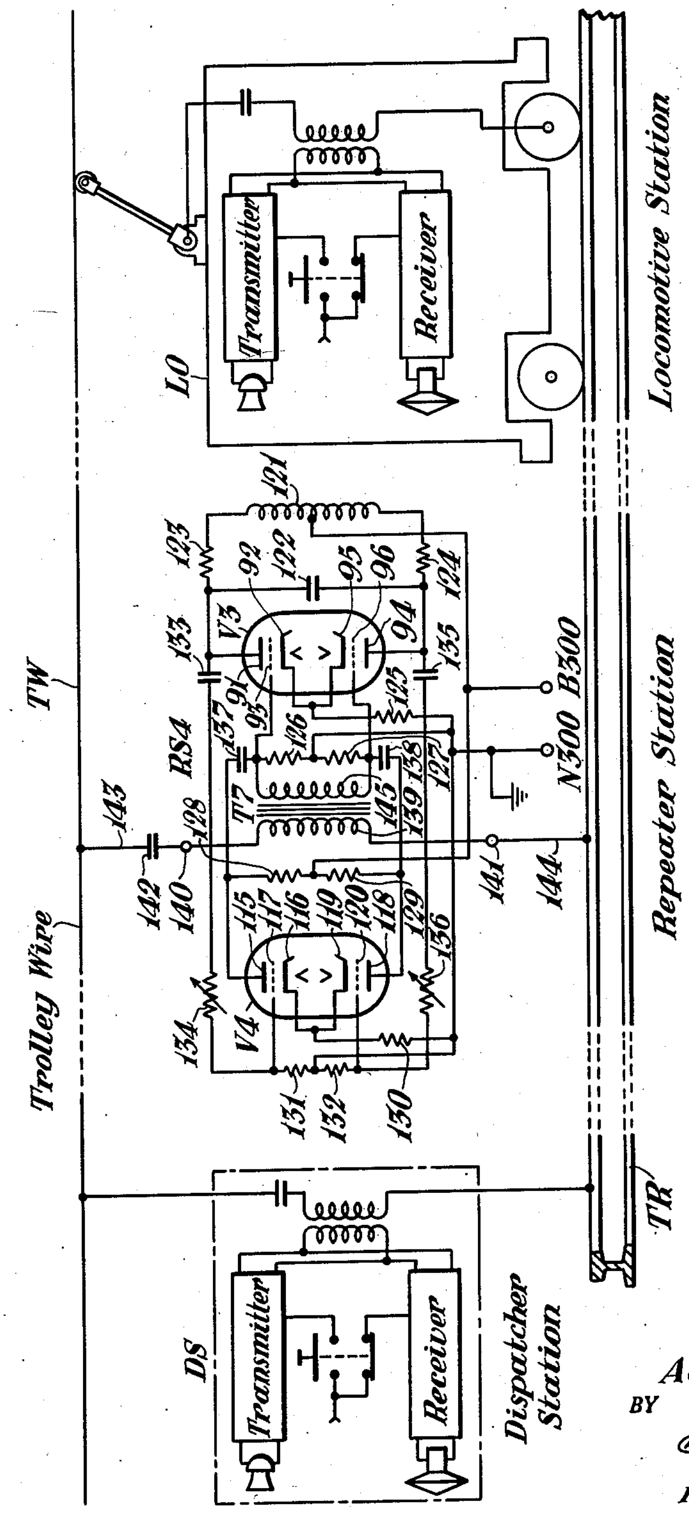
Figure 5:
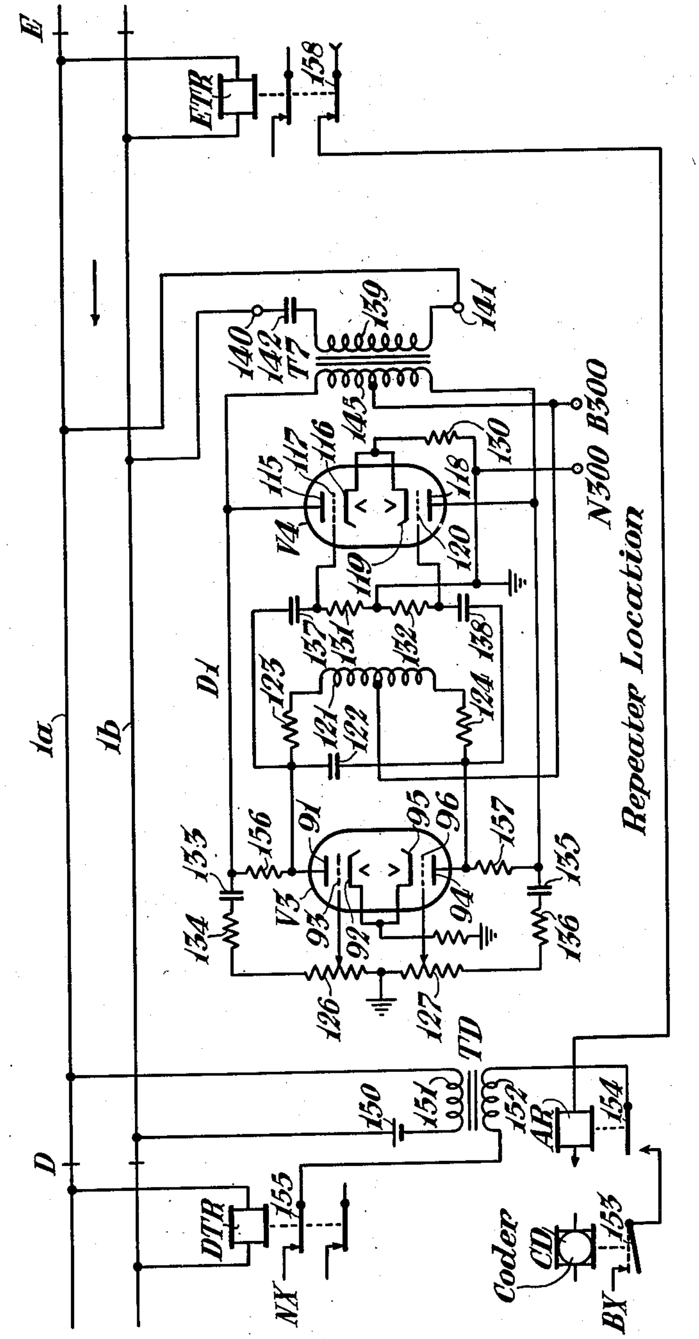

In the accompanying drawings, Fig. 1 is a diagrammatic view showing one form of repeater apparatus embodying my invention when applied to a mine communication system using frequency modulation and wherewith the trolley wire and the rails of the mine electric railway are employed as the transmitting medium for the communication system. Fig. 2 is a diagrammatic view showing another form of repeater apparatus embodying my invention and wherewith a two stage oscillator is provided, the apparatus being applied to a system which makes use of a transverse line circuit. Fig. 3 is a diagrammatic view showing repeater apparatus incorporating a synchronized oscillator-reactance modulator and a discriminator and which repeater apparatus also embodies the invention. Fig. 4 is a diagrammatic view showing repeater apparatus incorporating a push-pull oscillator stage and an amplifier stage and with the transmitting circuit coupled to the oscillator input or grid electrodes between the stages. Also the oscillating circuit of the oscillator stage is made to offer approximately resistive impedance at all frequencies of interest. This form of repeater apparatus also embodies the invention. Fig. 5 is a diagrammatic view showing repeater apparatus similar to that shown in Fig. 4 when applied to a signaling system using coded alternating current, such, for example, as a coded alternating current track circuit.

In each of the different views like reference characters are used to designate similar parts.

It is to be understood that repeater apparatus embodying my invention is not limited to the applications here disclosed in the drawings and these disclosures are by way of illustration, there being many applications where the apparatus is useful, as will be apparent to those skilled in the art.

Referring to Fig. 1, the reference characters TW and TR indicate the trolley wire and track rails respectively of an electric railway that may be installed in a mine. This trolley wire TW and the track rails TR are connected to a source of propulsion current in the usual manner, the source of propulsion current not being shown in the drawing since it forms no part of my invention and it may be of any suitable voltage and character of current.

The reference characters DS and LO indicate a dispatcher's office or station and a mine locomotive respectively. The dispatcher's station DS may be located at the mouth of the mine or any other suitable place from which the dispatcher can direct the movement of the mine locomotives of the electric railway system, the locomotive LO being one locomotive of this system. The station DS and the locomotive LO are equipped with communication equipment to provide two way telephone communication between the dispatcher and the operator of the locomotive. The communication equipment may take different forms, there being known arrangements for providing two way telephone communication by use of a frequency modulated carrier. The equipments at the station and on the locomotive are preferably alike and each includes a transmitter TN and a receiver RC, which are shown conventionally since their specific arrangement forms no part of my present invention. For example, these devices may be similar to the transmitter and receiver disclosed in a copending application for Letters Patent of the United States, Serial No. 575,311, filed January 30, 1945, by Paul N. Bossart, for Railway Train Communication and Alarm System Using Modulated Carrier Currents, now Patent No. 2,484,680, granted October 11, 1949.

It is sufficient for the present application to point out that each transmitter TN includes a source of carrier frequency current of a given center or original frequency and means to frequency modulate the carrier by the voice frequencies impressed upon a microphone MC. For example, the carrier may be one of 80 kc. and the modulation may have a frequency deviation band of 3 kc. above and below the fundamental carrier frequency. Each transmitter TN is normally deenergized and is energized from a suitable power source through a contact 10 of a push-to-talk switch PS, the contact 10 being closed when the switch PS is pressed to talk. Each receiver RC includes a demodulator capable of demodulating the frequency modulated carrier and to deliver a voice frequency current to a loud-speaker LS. In the case assumed above, the receiver RC would be capable of demodulating a carrier of 80 kc. when frequency modulated by a band of voice frequencies. Each receiver RC is normally energized through a normally closed contact 11 of the switch PS and in an active condition and each is deenergized and rendered inactive by the opening of the contact 11 when the switch PS is pressed to talk. It is to be understood that my invention is not limited to the carrier frequency and the modulation band referred to above and other carrier frequencies and modulation bands can be used.

The station DS and the locomotive LO are each provided with a special circuit connection between the trolley wire TW and the rails TR and with which circuit connection the communication equipment of the same station is coupled. At the dispatcher's station DS the circuit connection includes a wire 12 connected to the trolley wire, a blocking and tuning capacitor 13, a winding 14 and a wire 15 connected to the track rails. The special connection of the locomotive LO includes the usual trolley wheel 16 and trolley pole 17, wire 18, a blocking and tuning capacitor 19, a winding 20 and wire 21 connected through the locomotive wheels to the track rails TR. The winding 14 of the special connection at the station DS is one winding of a transformer T1, which is provided with a second winding 22 that is connected in multiple to the output of the transmitter TN and the input of the receiver RC of that station. Similarly, the winding 20 of the locomotive special circuit connection is one winding of a transformer T2, a second winding 23 of which is connected in multiple to the output of the transmitter TN and the input of the receiver RC on the locomotive. Thus the dispatcher at the station DS and the operator on the locomotive LO can carry on a two way telephone communication on the push-to-talk basis. When the dispatcher wishes to send he presses his switch PS to energize his transmitter TN and deenergize his receiver RC, and then speaks into the microphone MC. The voice frequency current in the microphone at the station DS is impressed upon the transmitter TN to frequency modulate the carrier and this carrier telephone current is then supplied to the transmitting circuit through the transformer T1 to be picked up by the receiver RC of the locomotive and demodulated and the voice frequency reproduced in the loud-speaker LS of the locomotive. To reply, the locomotive operator will press his switch PS to energize his transmitter TN and deenergize his receiver RC and he will then speak into the microphone MC. In each case the communication current flows in the trolley wire and the rails and the ground path between the station DS and the location of the locomotive LO.

In a mine the resistance between the trolley wire and ground is ordinarily of a relatively low value and the attenuation of the communication current may be high with the result the communication between the dispatcher's station DS and the locomotive LO may be satisfactory only when the locomotive is operating relatively close to the station DS. To improve the effectiveness of the communication system and to increase its effective range of transmission, I provide repeater apparatus embodying my invention at a repeater station RS.

The repeater station RS is located at a point selected according to the layout of the mine tracks as they extend from the location of the dispatcher's office DS, but in any event this repeater station would be located at no greater distance from the station DS than where the energy level of the communication current still in the trolley wire is above a predetermined value. In the event the extent of the mine track is such that a single repeater station is not able to provide effective communication between the station DS and a locomotive at the more remote points of the mine track, then additional repeater stations would be provided, each one being of substantially the same construction as that provided at the station RS.

Looking at the apparatus of the repeater station RS, a special circuit connection between the trolley wire and the rails is provided and which connection includes wire 24, having connection to the trolley wire TW in any convenient manner, a terminal 25, capacitor 26, winding 27, another terminal 28 and a wire 29 having connection to the rails and ground. The winding 27 is a first winding of a transformer T3 and the winding 27 and capacitor 26 are proportioned to form a series resonant circuit tuned to resonance at the center frequency of the carrier used for the communication current and which carrier frequency has been assumed hereinbefore as being of a frequency of 80 kc. The transformer T3 is provided with a second winding 30 connected in multiple with a capacitor 31, the winding 30 and capacitor 31 forming a parallel resonant circuit tuned to resonance at the center frequency of the communication current, that is, it is tuned to resonance at 80 kc. in the case here assumed. It is to be observed that the capacitor 26 will also serve to block the flow of the propulsion current in this special connection at the repeater station.

The repeater apparatus includes an electron tube V1, the input and output electrodes of which are connected to the resonant or oscillatory circuit 30—31 to form an oscillator. The tube V1 may be of any one of several different types and as here disclosed the tube V1 is a twin tetrode, a first section of which is provided with an anode 32, a screen grid 33, a control grid 34 and a cathode 35; and a second section of which tube is provided with an anode 36, a screen grid 37, a control grid 38, and a cathode 39. The tube V1 is provided with a filament or heater which is connected to a suitable source of current not shown, and the tube is constantly heated and is in an active condition.

The two anodes 32 and 36 of the tube V1 are connected to the outside terminals of the winding 30, and an intermediate terminal of winding 30 is connected to the positive terminal of a power source the terminals of which are indicated in the drawing at B300 and N300, the negative terminal N300 being connected to ground as is customary in circuits of this type. The two cathodes 35 and 39 of the tube V1 are connected together by wire 41 which is connected to ground through a resistor 42. Consequently each section of the tube V1 is provided with an anode-cathode circuit which is powered by the B300—N300 source and each of which circuits includes a half portion of winding 30 of the oscillatory circuit. The two screen grids 33 and 37 of the tube are tied together and a voltage is applied thereto from terminal B300 through a resistor 43, the screen grids being also provided with a bypass capacitor 44. The first section of the tube V1 is provided with a control grid-cathode circuit including resistors 45 and 42 in series, and similarly the other section of the tube is provided with a control grid-cathode circuit including resistors 46 and 42 in series.

The anode 32 of the first section of the tube is coupled to the control grid 38 of the second section of the tube through a feed-back circuit including a capacitor 47, and the anode 36 of the second section of the tube is coupled to the control grid 34 of the first section through a feed-back circuit including a capacitor 48. It is apparent from the foregoing that the two sections of tube V1 are connected to the oscillatory circuit 30—31 in such a manner as to form an electron tube oscillator of the push-pull type and which oscillator generates oscillations of a frequency predetermined by the proportioning of the parts. The parts are so proportioned that the oscillator generates oscillations at the center frequency of the carrier used for the communication system and which carrier frequency has been assumed to be 80 kc.

It is well known that an electron tube oscillator tends to synchronize with an injected voltage of approximately the same frequency as the oscillations normally generated by the oscillator. The amount which the oscillator frequency will deviate in order to synchronize with the injected voltage depends partly upon the stability of the oscillator and becomes greater as the frequency stability of the oscillator is reduced. It also depends in part upon the amplitude of the injected voltages. The two resonant circuits provided for the transformer T3 are coupled in such a manner as to provide the circuits with a resonant curve of a breadth which is selected according to the modulation frequency deviation and band of ±3 kc. That is, the coupling of the two resonant circuits for the transformer T3 is made of such a degree that the oscillator tends to synchronize with injected voltages over the modulation frequency band of the communication current used.

The two terminals 25 and 28 of the special connection between the trolley wire and rails at the repeater station RS form input and output terminals for the oscillator. Under normal conditions, that is, during noncommunication periods, the oscillator of the repeater station will generate its fundamental frequency and this energy will be passed through the transformer T3 to the winding 27 and impressed across the terminals 25 and 28. From the terminals 25 and 28 the carrier wave is applied to the transmitting channel including the trolley wire to flow in the trolley wire at both sides of the repeater station RS. Assuming that communication current is being sent from the station DS, the wave will appear across the terminals 25 and 28 at the repeater station RS to cause a corresponding electromotive force to be induced in the winding 30 of the transformer T3. This induced wave mixes with the oscillations created in the oscillatory circuit and the combination is fed to the control grids of the tube sections through the feed-back circuits. If the two waves, that is, the wave impressed upon the terminals 25 and 28 due to the current supplied by the transmitter at the station DS and the wave generated by the oscillator of the repeater station, are out of phase, the resultant will tend to keep the tube V1 from conducting and will therefore change the phase of the next cycle of the generated oscillations somewhat. The next cycle will be closer in phase with the injected voltage and this process will continue until the two waves are in phase. From this point on the two waves will aid each other in making the tube conductive. This correction in phase will occur almost instantaneously. Since frequency modulation is equivalent to phase change in the injected wave, the oscillator will follow or synchronize with the frequency deviation of the frequency modulated communication current within the frequency deviation band herein assumed, which is a plus or minus 3 kc. The frequency deviation wave thus created in the oscillatory circuit 30—31 will induce a corresponding wave in the winding 27 and this wave will appear across the terminals 25 and 28, the magnitude of this wave depending upon the output capacity of the oscillator. This output energy from the oscillator created across terminals 25 and 28 will cause a corresponding current wave to be supplied to the trolley wire to flow in the transmitting circuit of the communication system at each side of the repeater station. Consequently the wave applied to the terminals 25 and 28 due to the communication current supplied by the transmitter at the dispatcher's station DS is amplified and reapplied to the transmitting channel by the repeater apparatus of the station RS, the modulation of the amplified current being substantially the same as that of the original energy and in phase therewith. The repeated current will flow in the transmitting channel and will be impressed upon the special connection in the locomotive and its magnitude will be sufficient to effectively influence the receiver RC of the locomotive whereas the attenuation of the original current supplied at the dispatcher's station might be so great that the receiver RC on the locomotive would not be effectively responsive to the original energy.

It is clear that communication current supplied at the locomotive LO will be amplified and repeated in the trolley wire by the repeater apparatus at the station RS in the same manner as it repeated and amplified the energy supplied from the dispatcher's office DS. That is to say, the repeater apparatus is bidirectional.

In the case the locomotive LO is close to the repeater station RS and the communication current supplied to the trolley wire by the locomotive equipment is of a relatively high magnitude adjacent the repeater station, the increase in the magnitude of the voltage injected into the oscillator circuit of the repeater equipment would tend to cause the oscillator to synchronize more readily with the original communication current and there will be no distortion of the communication current due to the repeater equipment. In face, the locomotive transmitter and the repeater oscillator will function like two transmitters in parallel when the locomotive is close to the repeater station.

As stated hereinbefore, the oscillator of the repeater station supplies a nonmodulated current to the trolley wire during noncommunication periods. This nonmodulated carrier will be received by each receiver of the communication system and in the well-known manner the receiver will be quieted by this nonmodulated carrier. Thus the noise suppression or so-called "squelch" circuit usually provided in receivers of the type here involved may not be required and the construction of the receiver materially simplified.

In Fig. 2, two spaced stations A and B are connected by a line circuit including line wires L1 and L2 in series. That is, the transmitting circuit is a transverse line circuit between stations A and B.

The two stations A and B are provided with equipment for signaling or communicating between the two stations through the line circuit L1—L2. These communication equipments may be similar to those provided for the stations of Fig. 1, and by way of illustration, I shall assume that the equipments at the stations A and B use a carrier of the frequency of 80 kc. and a modulation band of plus and minus 3 kc.

At station A a transformer T4 has a first winding 50 connected in multiple to the output of the transmitter TN and the input of the receiver RC. A second winding 51 of transformer T4 is connected across the line circuit L1—L2 through lead wires 52 and 53, capacitors 54 and 55 being interposed in the lead wires 52 and 53, respectively. Similarly, at station B a transformer T5 has a first winding 56 connected in multiple to the output of the transmitter and the input of the receiver of that station. A second winding 57 of transformer T5 is connected across the line circuit through lead wires 58 and 59, capacitors 60 and 61 being interposed in the lead wires 58 and 59, respectively. It follows that telephone communication can be accomplished between the two stations A and B by use of the equipment provided at the two stations on a push-to-talk basis.

In the event the distance between the two stations A and B is relatively great and the attenuation of the communication current is so high that an effective response is not obtained for the communication equipment, a repeater station RS1 is located at a selected point between the stations and repeater apparatus embodying my invention is provided at this station.

The repeater apparatus at station RS1 comprises a synchronized or lock-in oscillator which is disclosed in Fig. 2 as being a two stage push-pull type oscillator. This oscillator includes a first stage tube V2 and a second stage tube V1. In Fig. 2 the first stage tube V2 is shown as a twin triode and the second stage tube V1 as a twin tetrade, the tube V1 being of substantially the same construction as the tube V1 of Fig. 1. One section of the tube V2 is provided with an anode 62, a cathode 63 and a control grid 64; and the other section of the tube is provided with an anode 65, a cathode 66 and a control grid 67. Two resistors 68 and 69 in series are connected across the anodes 62 and 65 of the first stage tube V2 and the junction terminal of these two resistors is connected to terminal B300 of the power source through resistor 43, while the two cathodes 63 and 66 of the tube V2 are connected to ground through a common resistor 70 so that each section of the tube is provided with an anode-cathode circuit. A control grid-cathode circuit for the first section of tube V2 includes resistors 71 and 70 in series, and a control grid-cathode circuit for the second section of the tube includes resistors 72 and 70 in series.

In Fig. 2 the oscillatory circuit comprises a center tap winding 73 of a transformer T6 and a capacitor 74 connected across the outside terminals of the winding to form a parallel resonant circuit. This oscillatory circuit 73—74 is coupled to the control grids 63 and 67 of the two sections of the first stage tube V2 through feed back connections including capacitors 79 and 80 and it is connected across the anodes 32 and 36 of the second stage tube V1. The intermediate terminal of winding 73 is connected to the terminal B300 of the power source, and the cathodes 35 and 39 of the tube V1 are connected to ground and thereby providing each section of the tube V1 with an anode-cathode circuit. The control grid 34 of tube V1 is connected to its cathode through resistor 75, and similarly the control grid 38 of the other section of tube V1 is connected to its cathode through resistor 76. The anode-cathode circuit of the first section of tube V2 is coupled to the control grid 34 of the first section of tube V1 through a capacitor 77, and a capacitor 78 couples the anode-cathode circuit of the second section of tube V2 to the control grid 38 of the second section of tube V1. It follows from the foregoing that the tubes V1 and V2 are arranged as a two stage oscillator of the push-pull type. The parts are so proportioned that the oscillator normally generates oscillations of a frequency corresponding to the center frequency of the communication current used by the equipments of stations A and B.

A winding 81 of transformer T6 is connected across terminals 82 and 83 in series with capacitors 84 and 85 and the terminals 82 and 83 are connected across the two line wires L1 and L2 through lead wires 86 and 87. The winding 81 and the capacitors 84 and 85 are proportioned to form a series resonant circuit tuned to resonance at the center frequency of the carrier used for communication between stations A and B.

The two resonant circuits of transformer T6 are coupled and proportioned in such a manner that the oscillator of the repeater station RS1 synchronizes with injected voltages of the frequency band used by the communication current.

Also, it is to be observed that the pair of terminals 82 and 83 are common to both the input and the output of this oscillator in the same manner that the terminals 25 and 28 of Fig. 1 are common to the input and output of the oscillator of the repeater of Fig. 1. Thus normally, that is, during noncommunication periods the repeater oscillator of Fig. 2 supplies to the line circuit L1—L2 a nonmodulated carrier having approximately the center frequency of the communication current. When station A, for example, is sending, the modulated communication current supplied to the line circuit by its transmitter is applied across the terminals 82 and 83 at the repeater station and the voltage injected into the oscillator tends to cause it to synchronize therewith and supply to the terminals 82 and 83 and thence to the line circuit the frequency modulated telephone current in amplified form. This repeated telephone current will flow in the line circuit and at station B it will be of a value that will effectively influence the receiver whereas the value of the original current supplied to the line circuit at station A may not be of sufficient value at station B to properly influence the receiver RS. Similarly, the repeater apparatus at station RS1 will function to repeat in the line circuit in amplified form the frequency modulated telephone current supplied to the line circuit by the transmitter at station B.

In Fig. 3, the repeater apparatus includes a synchronized oscillator, a reactance modulator and a discriminator. This repeater apparatus is disclosed as being applied to a mine communication system using the trolley wire and the rails and ground as the transmitting medium, but this repeater apparatus is not limited to this one use.

In Fig. 3, two spaced stations A and B are equipped with two-way carrier telephone apparatus having connections to the trolley wire for communication between the stations, the apparatus using frequency modulation and being substantially of the same construction as that described for the stations of Fig. 1.

A repeater station RS3 is located at a point selected for it to be approximately midway between the two stations A and B of Fig. 3, so that the repeater station will be equally effective as an aid in the transmission of communication current in each direction between the two stations A and B. The repeater apparatus at station RS3 comprises an oscillator-modulator and a discriminator. The oscillator-modulator includes a twin tetrode V1 and a tuned transformer T3, together with proper circuit connections. The transformer T3 of Fig. 3 has its winding 27 included in a series resonant circuit and its winding 30 included in a parallel resonant circuit the same as in Fig. 1. The upper section of tube V1 as viewed in Fig. 3 has its electrodes connected to the resonant or oscillatory circuit 30—31 to form a synchronized oscillator. However, the connections of the lower section of the tube and the circuit constants for both sections are modified for the lower section to function as a reactance modulator to modulate and control the oscillator section according to control voltages applied to the control grid of the lower section of the tube. These control voltages are obtained from the frequency modulation of the communication current received at the repeater station through a discriminator.

The discriminator may take different forms and it is here shown as including a transformer T10 having tuned primary and secondary windings, a pair of rectifiers 101 and 102, and a pair of output resistors 107 and 108. The primary winding 103 of the transformer T10 is connected across the capacitor 112 to form a parallel resonant circuit which is tuned to resonance at the center frequency of the carrier of the communication current. Similarly, the secondary winding 105 of the transformer T10 and capacitor 106 are connected to form a parallel resonant circuit tuned to resonance at the center frequency of the carrier. The tuned circuit including winding 103 and capacitor 112 is connected to the trolley wire TW through a blocking capacitor 104 and to ground, this connection being in multiple with the connection through winding 27 of the oscillator. The tuned circuit including secondary winding 105 and capacitor 106 of the transformer T10 is connected to the input of the rectifiers 101 and 102 and the output of the rectifiers is connected across the pair of resistors 107 and 108 in series. The junction terminal of the resistors is connected to the midterminal of the secondary winding 105 and which midterminal is in turn coupled to the tuned primary circuit of the transformer through a capacitor 109. A capacitor 90 is connected across the resistors 107 and 108, also the high potential terminal of the resistor 107 is connected to the control grid 38 of the modulator section of tube V1 through a resistor 110 and the low potential terminal of resistor 108 is connected to ground.

The circuit constants for the circuits for the section of tube V1 including anode 32, cathode 35, and control grid 34, and associated with the oscillatory circuit 30—31, are selected for the oscillator to normally generate oscillations of the frequency of the center frequency of the communication current. Also, the tuned primary and secondary windings of transformer T3 are coupled to give a relatively broad resonance curve so that the oscillator will synchronize with frequency deviating from the center frequency over the modulation frequency band of the communication current. Again, the circuit connections of the section of the tube V1 including anode 36 and cathode 39 and control grid 38 make this section of the tube to function as a reactance modulator for frequency modulating the oscillations in accordance with the variations in amplitude of the control voltage applied to the control grid 38 of the modulator section.

Assuming that communication current is supplied to the trolley wire by the transmitter of either of the stations A or B of Fig. 3, this current in an attenuated form will flow in the connections at the repeater station RS3, a portion of the current flowing in the tuned circuit comprising capacitor 26 and winding 27 in the input of the oscillator and a portion of the current flowing in the tuned circuit 103—112 of the discriminator. The current flowing in the oscillator input connection will induce a corresponding voltage in the winding 30 of the oscillatory circuit with the result a voltage having a frequency variation corresponding to the modulation of the communication current is injected into the oscillator to synchronize the oscillator, this action being substantially the same as that effected by the apparatus of Fig. 1.

The portion of the communication current flowing in tuned circuit 103—112 of the discriminator will set up a corresponding voltage in the tuned circuit 105—106 and which induced voltage will be applied to the rectifiers 101 and 102 with the result a voltage variable in amplitude according to the frequency modulation of the communication current is created across the two resistors 107 and 108. This voltage variable in amplitude is applied to the control grid 38 of the modulator section of tube V1 with the result that the oscillations generated by the oscillatory section of the tube are frequency modulated according to the amplitude variations of the control voltage. In other words, the oscillations are frequency modulated according to the frequency modulation of the communication current.

The connections are made in such a manner that the phase of the control voltage applied to the modulator section of the tube V1 causes the oscillator to be less stable with the result that the synchronizing or lock-in range of the oscillator is materially increased. The output of the oscillator which is the incoming frequency modulated communication current in amplified form is applied to the terminals 25 and 28 in the connection to the trolley wire and in turn to the trolley wire, and this repeated current is in phase with the original current due to the synchornizing of the oscillator. This repeated current flows in the transmitting medium from the repeater station RS in each direction and is available to influence the receiver for the station remote from the station sending the communication current, the receiver being effectively influenced due to the amplified form of the repeated current whereas the attenuation of the original current would be so great that only feeble response would be obtained by the receiver therefrom.

The apparatus of Fig. 3 has the advantages that the lock-in range of the oscillator is increased. For example, I have found that if the circuit constants of a synchronized oscillator are selected to provide a lock-in range of the order of $\pm 6$ kc., the lock-in range of the oscillator is increased to the order of $\pm 8$ kc. by the use of the discriminator network and reactance modulator of Fig. 3. This increase in the lock-in range is particularly useful where two or more repeater stations are required because with this increase in lock-in band width, the usual loss of synchronizing band width at repeater stations is avoided.

It is to be pointed out that with the apparatus of Fig. 3 the parts are so proportioned and adjusted that the amount of feed-back from the oscillator to the discriminator input is made just enough to overcome the usual loss in the synchronizing range.

Referring now to Fig. 4, another form of repeater apparatus embodying the invention is shown applied to a communication system which uses the trolley wire and rails of an electric railway as the transmitting medium. In Fig. 4, the equipments at a dispatcher's station DS and on a locomotive LO are the same as in Fig. 1 and they need not be further described.

The apparatus at the repeater station RS4 comprises a two stage oscillator of the push-pull type and a connection between the trolley wire TW and the track rails TR which is coupled into resistive elements between the stages. The oscillator includes two tubes V3 and V4 each of which is shown as a twin triode but other types of tubes can be used. One section of tube V3 is provided with an anode 91, a cathode 92 and a control grid 93; and the second section of the tube is provided with an anode 94, a cathode 95 and a control grid 96. Similarly, one section of tube V4 is provided with an anode 115, a cathode 116 and a control grid 117; and the other section of the tube is provided with an anode 118, a cathode 119 and a control grid 120.

The oscillatory circuit comprises a center tapped inductance winding 121 and a capacitor 122 together with two resistors 123 and 124, the circuit being tuned to resonace at a given carrier frequency and the resistors preferable being selected to give the circuit a relatively low Q characteristic. This oscillatory circuit is connected across the anodes of the tube V3 and the midterminal of the winding 121 is connected to the B300 power terminal and the cathodes of the tube are connected to ground through a resistor 125 to complete anode circuits. A grid circuit including resistors 126 and 125 in series is connected across the grid 93 and cathode 92 of one section of tube V3, and a grid circuit including resistors 127 and 125 is connected across grid 96 and cathode 95 of the other section of the tube.

The anode circuits for the tube V3 are coupled to its grid circuits through a feed-back circuit network which includes the tube V4. Two resistors 128 and 129 in series are connected across the anodes of tube V4 and the junction terminal of these resistors is connected to the B300 power terminal, and the cathodes of the tube V4 are connected to ground through a resistor 130, thus providing anode-cathode circuits for the tube. Two resistors 131 and 132 in series are connected across the grids of tube V4 and the junction terminal of these resistors is connected to the cathodes through resistor 130 and thus providing grid circuits for the tube. The anode 91 of tube V3 is coupled to the grid 117 of tube V4 through a connection including capacitor 133 and resistor 134, and similarly the anode 94 of tube V3 is coupled to grid 120 of tube V4 through capacitor 135 and resistor 136. Also, two capacitors 137 and 138 couple the anodes 115 and 118 of tube V4 to the grids 93 and 96, respectively, of tube V3.

It follows that the two tubes V3 and V4 together with the associated circuits form a two stage push-pull oscillator.

Preferably, the circuit elements are so proportioned and adjusted that free oscillations are avoided and oscillations are forced only when voltages of a given carrier frequency are applied to the oscillator.

The connection for coupling the oscillator at the station RS4 to the transmitting circuit includes a transformer T7, a first winding 139 of which is connected across a pair of terminals 140 and 141, the terminal 140 being connected to the trolley wire TW through capacitor 142 and wire 143 and terminal 141 being connected to the track rails through wire 144. A second winding 145 of transformer T7 is connected across resistors 126 and 127 of the grid circuits of tube V3. It is to be seen that voltages created across the terminals 140 and 141 of the repeater station RS4 due to communication current supplied to the transmitting circuit by the transmitter at either the station DS or the locomotive LO are applied to the grids of tube V3 through the transformer T7 and oscillations are forced in the oscillatory circuit. These oscillations are fed back through tube V4 to be applied to the input of the tube V3. The parts are so proportioned that the fundamental frequency of the oscillator at station RS4 is the same as the center frequency of the communication current. Also the oscillatory circuit 121—122 is proportioned to offer approximately resistive impedance at all frequencies within the band used by the frequency modulated communication current and the oscillator synchronizes with the incoming voltages created across the terminals 140 and 141 due to the equipments at the station DS and on the locomotive. Due to the action of the tubes V3 and V4 at the repeater station, oscillations are created in winding 145 of transformer T7 and corresponding voltages are induced in winding 139 and applied to the terminals 140 and 141 and in turn the voltages are applied to the transmitting circuit. This energy applied to the transmitting circuit at the repeater station will have the same carrier frequency, modulation and phase as the voltages applied to the terminals 140 and 141 from the transmitting circuit. Consequently communication current supplied by the transmitter at the dispatcher's station or at the locomotive station will be amplified and reapplied to the transmitting circuit by the repeater apparatus with the result the communication between the dispatcher's station and the locomotive will be made effective due to the amplified current whereas the original communication current may be too greatly attenuated to effectively influence the receiver at the receiving point.

As stated hereinbefore, the parts of the apparatus of Fig. 4 are proportioned and adjusted that the oscillator is inactive during noncommunication periods, but as soon as communication current appears at the terminals of the repeater apparatus the oscillator becomes active. It is to be understood that the apparatus of Fig. 4 can be arranged so that the fundamental frequency is generated during noncommunication periods and the oscillator synchronizes with the frequency modulated voltage appearing at the terminals 140 and 141.

The apparatus of Fig. 4 has the advantages that it is operative by a very low voltage and thus it can allow a relatively high attenuation of the original communication current before repeater facilities are required.

The coupling of the transmitting circuit into resistive elements between stages permits operation under conditions of widely varying trolley wire impedance such as may result from connecting heavy power drains near the repeater station. Furthermore, three or more of the repeaters in succession can be used and each will faithfully follow the original transmitter and a relative high overall gain for the system obtained.

In Fig. 5, a form of repeater apparatus embodying the invention is shown applied to a signaling circuit using coded alternating current, the signaling circuit shown being a track circuit of a railway signal system. In Fig. 5, the reference characters 1a and 1b designate the track rails of a railway over which traffic normally moves in the direction indicated by an arrow. These rails are formed in the usual manner with a track section D—E, this section being one section of a signal system. The section D—E is provided with a track circuit which includes the track rails, a source of energy connected across the rails at one end of the section and a track relay connected to the rails at the other end of the section. As illustrated the track circuit is supplied with direct current for energizing a track relay when the section is unoccupied and coded alternating current is superimposed on the direct current for control of cab signals when a train moves through the section. A battery 150 is connected across the rails at the exit end D of the section in series with a winding 151 of a transformer TD and supplies a direct current which is effective to energize a direct current track relay ETR connected across the rails at the entrance end E of the section when the section is unoccupied.

Under traffic conditions to be shortly described, a source of alternating current is supplied to a winding 152 of the track transformer TD. This source of alternating current is indicated by the terminals BX and NX and it may be of any convenient frequency such as, for example, 100 cycles per second, but other frequencies can be used. The connection of the source to the winding 152 includes a contact 153 of a coder CD and a back contact 154 of an approach controlled relay AR to be referred to shortly, together with a front contact 155 of a track relay DTR for the section next in advance of section D—E. The coder CD may take different forms and as illustrated it is of the relay type which is operative to recurrently close its contact 153 at a selected code rate as long as the operating winding of the coder is supplied with energy from a source not shown.

By way of illustration, I shall assume the coder CD operates its contact 153 at the rate of 75 times per minute but other code rates can be used. The coder is normally active and thus when relay AR is released to close its back contact 154 and relay DTR is picked up closing its front contact 155, pulses of alternating current of 100 cycles per second are supplied to the track rails through transformer TD, the pulses having the code rate of 75 pulses per minute. In other words, a carrier current of 100 cycles is coded by being periodically interrupted at the rate of 75 times per minute, the current being supplied to the track rails under a given traffic condition. In the well-known manner this coded current will be effective to inductively control cab signals of a train moving through the section. For example, such a cab signal system is fully described in Letters Patent of the United States No. 2,046,179, granted June 30, 1936, to Frank H. Nicholson for Railway Traffic Controlling Apparatus.

It is sufficient for the present application to point out that the track section D—E may be of such a length that the coded alternating current supplied to the rails at the exit end may become attenuated to such a degree that it does not effectively influence the cab signal apparatus when the train is at the entrance end of the section and a cut section or repeater apparatus is required. To this end, repeater apparatus embodying the invention is located at a selected point intermediate the ends of the section D—E to amplify and resupply to the rails the original coded current. This repeater apparatus is located at a selected point DI intermediate the ends D and E of the section and it comprises a two stage oscillator and a coupling connection across the rails. The two stage oscillator is similar to that shown in Fig. 4 except for the tuning of the circuits and the manner of coupling the transmitting circuit, which is the track circuit in Fig. 5, to the oscillator.

In Fig. 5, the incoming alternating voltage appearing across the terminals 140 and 141 due to the alternating current supplied to the track rails through transformer TD, causes corresponding voltages to be induced in winding 145 of the transformer T7 and which induced voltages are applied to the two sections of tube V3 through the connection including capacitor 133, resistors 134 and 126 for the top section of the tube V3 and through the connection including capacitor 135 and resistors 136 and 127 for the lower section of the tube. These voltages applied to grids 93 and 96 of tube V3 force oscillations to be created in the anode circuits which include the oscillatory circuit. The oscillations are applied to the grids 117 and 120 of the tube V4 through the coupling capacitors 137 and 138 and corresponding oscillations are created in the anode circuits of the tube V4 which circuits include the two half portions of winding 145 of transformer T7. These amplified oscillations are transferred through the transformer T7 and are applied across terminals 140 and 141 as output terminals of the repeater apparatus. The oscillations thus applied to the terminals 140 and 141 from the repeater apparatus are supplied to the track circuit to flow in the rails in each direction from the location D1. This alternating energy resupplied to the rails will be in phase with the original energy supplied through transformer TD with the result the magnitude of the alternating current flowing in the rails will be increased and effective operation of the cab signals will be obtained when the train is near the entrance end E whereas the magnitude of the original energy at the entrance end D might not be sufficient to operate the cab signals.

In Fig. 5, the parts are proportioned so that no free oscillations are created by the oscillator and oscillations are produced and maintained only when the external voltages from the track circuit are injected into the oscillator circuits. Thus the repeater apparatus of Fig. 5 follows the original code of the alternating current which code has been assumed to be 75 pulses per minute. It is to be noted that in Fig. 5 the oscillator needs to be adjusted to synchronize only with the single carrier frequency of 100 cycles per second.

The tube V3 of Fig. 5 is provided with degenerative feed-back connections including resistors 156 and 157 to improve the operation of the apparatus, but these connections may not be required.

Thus, when a train enters the section D—E at the entrance end and shunts the track relay ETR, the opening of front contact 158 of relay ETP interrupts the line circuit for the approach relay AR and that relay is deenergized and released closing back contact 154. With the section next in advance unoccupied and track relay DTR picked up closing its front contact 155, the release of relay AR completes the circuit to the BX—NX source and coded alternating current is supplied to the track rails. This coded alternating current creates a corresponding voltage across the terminals 140 and 141 of the repeater apparatus. The alternating voltage of terminals 140 and 141 causes forced oscillations to be generated by the oscillator of the repeater apparatus, the oscillator synchronizing with the incoming alternating voltage. The oscillations are amplified and reapplied to terminals 140 and 141 and in turn to the track rails with the result that coded alternating current of a magnitude sufficient to properly operate the cab signals of the train when the train is near the entrance end of the track section is assured. Also, the oscillator is characterized in that free oscillations are avoided and in that it follows the coding of the injected voltages.

It is to be pointed out that the forms of repeater apparatus shown in Figs. 1, 2, 3, and 4 can readily be used with systems using coded alternating current such as used in Fig. 5. Also, it is clear that the repeater apparatus of Fig. 5 can be used in signaling systems that use a coded alternating current of a relatively high carrier frequency transmitted over a line circuit. Furthermore, in systems using one carrier frequency for transmission in one direction and a different carrier frequency for transmission in the other direction, repeater apparatus embodying my invention can be used by providing a repeater for each direction.

Repeater apparatus here disclosed has the further advantages that it is of simple construction, it can be applied readily to a transmitting line circuit or other forms of transmitting medium, it repeats the original modulated wave with little or no distortion and the frequency modulation band is not reduced in breadth.

Although I have herein shown and described only five forms of repeater apparatus for communication and signaling systems embodying my invention, it is understood that various changes and modification may be made therein within the scope of the appended claims without departing from the spirit and scope of my invention.

Having thus described my invention, what I claim is:

1. In repeater apparatus for modulated alternating current, the combination comprising, a first and a second pair of electron tubes; each said tubes having an anode, a cathode and a control grid; an oscillatory circuit including a mid terminaled winding and a capacitor connected in multiple, said oscillatory circuit being connected across the anodes of said first pair of tubes, a pair of resistors connected in series across the control grids of said first pair of tubes, said cathodes of said first pair of tubes connected in multiple to the junction terminal of said pair of resistors, a power source, means to connect said power source between the mid terminal of the winding of the oscillatory circuit and the junction terminal of said pair of resistors, a mid terminaled impedance element connected across the anodes of said second pair of tubes, another pair of resistors connected in series across the control grids of the second pair of tubes, said cathodes of said second pair of tubes connected in multiple to the junction terminal of said another pair of resistors, means to connect said power source to the mid terminal of said impedance element and the junction terminal of said another pair of resistors, means including capacitors to couple the anodes of said first pair of tubes to the control grids of the second pair of tubes, other means including other capacitors to couple the anodes of said second pair of tubes to the control grids of said first pair of tubes, a transformer having a first and a second winding, said first transformer winding being coupled across the control grids of said first pair of tubes, and said second transformer winding being included in a connection to which modulated alternating current can be applied.

2. In repeater apparatus for modulated carrier current, the combination comprising a synchronizing oscillator and a bidirectional coupling circuit; said oscillator having a first and a second pair of electron tubes each of which tubes has an anode, a cathode and a control grid; an oscillatory circuit including a mid terminaled winding and a capacitor connected in multiple and tuned to resonance at a given frequency. said oscillatory circuit being connected across the anodes of said first pair of tubes, a pair of resistors in series connected across the control grids of said first pair of tubes and having their junction terminal connected to the cathodes of said first pair of tubes in multiple, a power source having connections to the mid terminal of the winding of said oscillatory circuit and said junction terminal of said pair of resistors, a mid terminaled impedance element connected across the anodes of said second pair of tubes, another pair of resistors in series connected across the control grids of said second pair of tubes and having their junction terminal connected to the cathodes of the second pair of tubes in multiple, said power source being connected between the mid terminal of said impedance element and the junction terminal of said another pair of resistors, a pair of circuit paths each including a capacitor and connected one between each of the anodes of the first pair of tubes and each of the control grids of the second pair of tubes, another pair of circuit paths each including a capacitor and connected one between each of the anodes of the second pair of tubes and each of the control grids of the first pair of tubes, and said bidirectional coupling circuit including a winding and a capacitor series tuned to resonance at said given frequency and having its winding electrically coupled to a selected circuit element of said oscillator, whereby modulated carrier current of said given carrier frequency applied to said synchronizing oscillator through said coupling circuit is reapplied to the coupling circuit in amplified form from said oscillator.

3. In repeater apparatus for modulated carrier current a synchronizing oscillator comprising in combination; a first and a second pair of electron tubes each of which tubes has an anode, a cathode and a control grid; an oscillatory circuit having a winding and a capacitor tuned to resonance at a selected carrier frequency, said oscillatory circuit being connected across the anodes of said first pair of tubes, a first pair of resistors in series connected across the control grids of said pair of tubes, said cathodes of said first pair of tubes in multiple connected to the junction terminal of said pair of resistors, a power source connected between a midterminal of the winding of said oscillatory circuit and said junction terminal of said pair of resistors, a midterminaled impedance element connected across the anodes of said second pair of tubes, a second pair of resistors in series connected across the control grids of said second pair of tubes, the cathodes of said second pair of tubes in multiple connected to the junction terminal of said second pair of resistors, said power source being connected between the midterminal of said impedance element and said junction terminal of said second pair of resistors, a first and a second pair of coupling circuits each of which circuits includes a capacitor, said first pair of circuits connected individually to an anode of said first pair of tubes and a control grid of said second pair of tubes, the second pair of said circuits connected individually between an anode of the second pair of tubes and a control grid of the first pair of tubes, and a common input-output winding electrically coupled to the control grids of said first pair of tubes.

ADRIAN R. DOUCETTE.

References Cited in the file of this patent

UNITED STATES PATENTS

| Number | Name | Date |
|---|---|---|
| 2,102,419 | Klutke | Dec. 14, 1937 |
| 2,250,532 | Hansell | July 29, 1941 |
| 2,320,428 | Hansell | June 1, 1943 |
| 2,400,822 | Hansell et al. | May 21, 1946 |
| 2,415,773 | Vilkomerson | Feb. 11, 1947 |
| 2,447,248 | Harris | Aug. 17, 1948 |